(12) United States Patent
Kawachi et al.

(10) Patent No.: US 6,740,426 B2
(45) Date of Patent: May 25, 2004

(54) SLIDING MEMBER WITH COMPOSITE PLATING FILM

(75) Inventors: Toshiaki Kawachi, Nagoya (JP); Hideo Ishikawa, Nagoya (JP); Masaaki Sakamoto, Nagoya (JP)

(73) Assignee: Daido Metal Co., Ltd., Nagoya (JP)

( * ) Notice: Subject to any disclaimer, the term of this patent is extended or adjusted under 35 U.S.C. 154(b) by 10 days.

(21) Appl. No.: 10/263,816

(22) Filed: Oct. 4, 2002

(65) Prior Publication Data

US 2003/0118862 A1 Jun. 26, 2003

(30) Foreign Application Priority Data

Nov. 15, 2001 (JP) .......................................... 2001-350100

(51) Int. Cl.$^7$ ........................... B32B 15/01; B32B 5/12; C22C 11/04; C22C 11/06; C25D 15/02
(52) U.S. Cl. ...................... 428/645; 428/621; 384/912
(58) Field of Search .................. 428/645, 621; 384/912

(56) References Cited

U.S. PATENT DOCUMENTS

| | | | | |
|---|---|---|---|---|
| 5,298,336 A | * | 3/1994 | Tanaka et al. | 428/552 |
| 5,328,772 A | * | 7/1994 | Tanaka et al. | 428/548 |
| 5,413,875 A | * | 5/1995 | Tanaka et al. | 428/645 |
| 5,424,138 A | * | 6/1995 | Tanaka et al. | 428/553 |
| 5,434,012 A | * | 7/1995 | Tanaka et al. | 428/643 |
| 5,543,236 A | * | 8/1996 | Tanaka et al. | 428/614 |
| 5,882,587 A | * | 3/1999 | Okamoto et al. | 420/570 |
| 5,976,712 A | * | 11/1999 | Staschko et al. | 428/645 |
| 6,025,081 A | * | 2/2000 | Ohshiro et al. | 428/644 |

FOREIGN PATENT DOCUMENTS

| | | |
|---|---|---|
| GB | 1463474 A | 2/1977 |
| GB | 2239027 A | 6/1991 |
| GB | 2 356 026 A | 5/2001 |
| JP | 02-049132 | 9/1991 |
| JP | 03219098 A | 9/1991 |
| JP | 03-097090 | 11/1992 |
| JP | 04325697 A | 11/1992 |

* cited by examiner

Primary Examiner—John J. Zimmerman
Assistant Examiner—Jason Savage
(74) Attorney, Agent, or Firm—Browdy and Neimark

(57) ABSTRACT

Disclosed is a sliding member having a bearing alloy layer and a composite plating film provided on the bearing alloy layer. The composite plating film is made of a lead alloy containing 0.1 to 10 mass percent in total of copper and 0.3 to 25 volume percent in total of co-deposited inorganic particles. The outermost surface layer of the composite plating film, which has a thickness proportion of 10 to 40% to the entire thickness of the composite plating film, does not contain inorganic particles and copper. The lower layer of the composite plating film contains Cu and inorganic particles, such as $Si_3N_4$, dispersed therein.

4 Claims, 1 Drawing Sheet

SLIDING MEMBER WITH COMPOSITE PLATING FILM

BACKGROUND OF THE INVENTION

The present invention relates to a sliding member used as bearings for automobiles, ships, aircraft or general industrial machines.

PRIOR ART

As such type of sliding member, there has been known one comprising a steel back, a bearing alloy layer being made of a copper or aluminum alloy for example and provided on the steel back, and a lead alloy plating film formed on the surface of the bearing alloy layer via an intermediate plating layer.

In recent engines of motor vehicle, under demands for cost reduction, shafts made of cast iron such as nodular graphite cast iron have come into popular use. Such cast iron shafts, however, have a problem that the surface layer of bearings, which supports the shaft, tends to suffer early wear due to burrs existing around graphite grains on the shaft surface, resulting in that the intermediate plating layer or the bearing alloy layer exposes to cause rapid seizure.

In the case of commonly used steel shafts, they tend to be used under a high speed and a high load, so that there has arisen the same problem, as mentioned above, of early wear of the surface layer of bearings.

In order to solve such a problem, the present inventors proposed previously, in a previous application of JP-A-2-49132, to use a composite plating film as an overlay of the sliding member. The former invention relates to forming a composite plating film on a bearing alloy layer, the composite plating film being made of a lead alloy containing 2 to 30 mass % in total of at least one element selected from Sn, In, Sb and Cu and 0.3 to 25 vol % of co-deposited inorganic particles, wherein the lead matrix is protected by the relatively hard inorganic substance in the composite plating film thereby preventing the surface layer of the sliding member from wear.

The composite plating film, however, has a problem that it has a rough surface due to the presence of inorganic particles, thereby causing an increase of wear of the mating shaft although the wear resistance property of the sliding member is improved.

Thus, the present inventors studied the problem and reached a conception that it is possible to improve conformability between the sliding member and the mating shaft in an initial stage at running-in by reducing an amount of a dispersion of inorganic particles in the surface layer of the lead alloy composite plating film and increasing an amount of a dispersion of inorganic particles gradually or continuously in proportion to the depth of the composite plating film, whereby assuring subsequent wear resistance of the sliding member. A patent application of JP-A-3-97090 is based on this idea.

According to JP-A-3-97090, the lead alloy composite plating film contains copper in order to cope with a rise of bearing surface pressure for the sake of developing high power engines. However, when copper is added to the lead alloy composite plating film, there arise a potential problem of occurrence of sudden seizure because of inferior conformability of the composite plating film due to hard copper, although the composite plating film can be improved in mechanical strength.

BRIEF SUMMARY OF THE INVENTION

Accordingly, an object of the present invention is to provide a sliding member having a composite plating film made of a lead alloy containing copper and inorganic particles dispersed in the lead alloy, which does not suffer seizure at an early stage, is capable of minimizing wear of its own and the mating member, and has excellent fatigue resistance property, even if it is used under a high speed and a high load in operation of an engine.

Under the above object, according to the present invention, there is provided a sliding member comprising a bearing alloy layer and a composite plating film provided on the bearing alloy layer, wherein the composite plating film is made of a lead alloy containing 0.1 to 10 mass percent in total of copper and 0.3 to 25 volume percent in total of co-deposited inorganic particles, and the outermost surface layer of the composite plating film, which has a thickness proportion of 10 to 40% to the entire thickness of the composite plating film, does not contain inorganic particles and copper.

Since the outermost surface layer of the lead alloy composite plating film does not contain inorganic particles, it is possible to lower the coefficient of friction at the running-in stage or the initial wear stage, whereby it is possible to reduce wear of not only the mating member but also that of the sliding member itself. Also, as the outermost surface layer of the composite plating film contains no copper or, if any, only a trace amount of copper, it is possible to improve the composite plating film in initial conformability at the running-in stage, whereby the problem of sudden seizure of the plating film can be solved.

In usual, the lead alloy composite plating film has a thickness of 10 to 30 $\mu$m in the case where the sliding member is a component of motor vehicle engines. The thickness, however, is not restrictive, in some cases, for example, in the case of the sliding member for ship engines, it may be 50 to 100 $\mu$m.

When the sliding member and the mating member are in the stage of normal wear after having been well conformed to each other in the initial stage of operation, since the sub-layer containing inorganic particles and copper beneath the outermost surface layer is exposed, the sliding member is prevented from wear and also hard to fatigue.

If the thickness of the outermost surface layer containing none of inorganic particles and copper is less than 10% of the composite plating film thickness, the initial conformability of the composite plating film is inferior. And, if the thickness of the outermost surface layer containing none of inorganic particles and copper exceeds 40% of the composite plating film thickness, it is impossible to expect the effect of improving wear and fatigue resistance of the composite plating film.

The lead alloy of the composite plating film preferably contains 2 to 30 mass % in total of at least one of Sn and In. Sn and In improve the outermost surface layer of the composite plating film in mechanical strength and corrosion resistance to lubricating oils. If the total content of the elements is less than 2 mass %, the composite plating film is low in mechanical strength and corrosion resistance for a long term. If the content exceeds 30 mass %, the composite plating film is extremely deteriorated in mechanical strength at high temperature. Thus, the content of the above elements should be 2 to 30 mass %, preferably 3 to 25 mass %.

The sliding member of the present invention is of a multilayer structure comprising a steel back, a copper-based or aluminum-based bearing alloy layer, and an overlay layer of composite plating film made of a lead alloy. Preferably, an intermediate plating layer is interposed between the composite plating film and the copper-based or aluminum-based bearing alloy layer.

The intermediate plating layer consists of any one metal selected from the group of Ni, Ag, Cu, Co and an alloy containing the metal as a major component. Ni and Co serves for preventing Sn and/or In in the composite plating film as a surface layer from diffusing into the base alloy (i.e. bearing alloy) thereby preventing deterioration of strength and corrosion resistance of the matrix of the base alloy. With regard to Cu and Ag, advantageously they produce a diffusion alloy together with In contained in the composite plating film in view of sliding characteristics, and further advantageously it is possible to improve the anti-seizure property by plating Cu and/or Ag on the aluminum alloy.

BRIEF DESCRIPTION OF EMBODIMENTS OF THE INVENTION

Herein below, there will be provided a description of invention examples and advantages of the invention in comparison with comparative examples.

Figure 1:
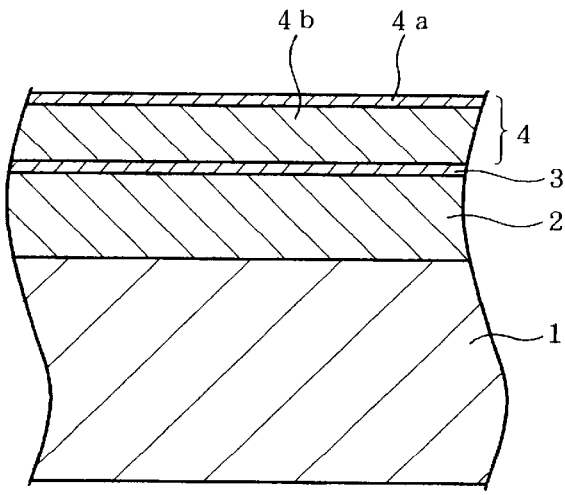
FIG. 1 is a sectional view of a sliding member according to the present invention.

FIG. 1 is a sectional view of a sliding member of the invention. In the sliding member, a bearing alloy layer 2 is formed on one side of a steel back 1, and a lead alloy composite plating film 4 is provided on the bearing alloy layer 2 via an intermediate plating layer 3. The composite plating film 4 consists of upper and lower two layers 4a and 4b which are made of a lead alloy, as a major material, containing Sn and/or In. The lower layer 4a contains Cu and inorganic particles, such as $Si_3N_4$, dispersed therein. The upper layer 4b, which is the outermost surface layer, contains neither Cu nor dispersed inorganic particles. The overall thickness of the composite plating film 4, for motor vehicle engines, is preferably in the range of 10 to 30 $\mu$m and the thickness of the outermost surface layer 4b is preferably 10 to 40% of the overall thickness of the composite plating film 4.

The sliding member can be produced in the following way. First, a copper alloy powder (e.g. Cu—2Pb—3.5Sn) is spread on one side of the steel back 1 and then sintered, or an aluminum bearing alloy sheet (e.g. Al—6Sn—1Cu—1Ni) is superimposed on the steel back 1 and rolled integrally, to form a bearing alloy layer 2. The thus obtained product is then cut and mechanically processed to produce bearings.

The bearings are subjected to the ordinary pre-treatments, viz. solvent degreasing, electrolytic degreasing and pickling in this order, and subsequently an intermediate plating layer 3 is formed on the bearing alloy layer 2, the intermediate plating layer 3 having a thickness of 1.5 $\mu$m and consisting of any one selected from the group of Ni, Cu, Ag, Co and an alloy thereof. Thereafter, the bearings are subjected to a co-deposition plating treatment at a bath temperature of 25° C. and a cathode current density of 3 to 5 $A/dm^2$, wherein there is used a usual plating bath of a fluoroborate for Pb alloy in which a $Si_3N_4$ powder (a particle size: not greater than 1 $\mu$m) is dispersed as inorganic particles in an amount of 15 to 25 g/l, whereby a Pb—Sn—Cu alloy layer containing dispersed inorganic particles is formed on the intermediate plating layer 3. Subsequently, an In plating is provided on the lead alloy layer.

Finally, the bearings are subjected to a heat treatment, whereby Pb and Sn in the lead alloy layer are diffused into the In layer (Cu does not diffuse) while In in the In layer is diffused into the underlying lead alloy layer. Consequently, a composite plating film 4 made of a lead alloy is formed, in which the lower layer 4a contains Cu and inorganic particles, while the outermost surface layer 4b contain neither Cu nor inorganic particles.

In order to confirm the effect of the present invention, the present inventors produced invention examples 1 to 8 and comparative examples 1 to 3, which have the composite plating films having the lead alloy compositions shown in Table 1, according to the method described above, and conducted a seizure test and a fatigue test thereon.

In the column of "Bearing alloy" in Table 1, there are only shown Cu and Al which indicate a Cu alloy and an Al alloy, respectively. In the column of "Pb alloy", there are shown common components, except for Cu and inorganic particles, in the lower layer and the outermost surface layer. In the column of "Rate of outermost surface layer", there are shown thickness rates each of which is a rate of the outermost surface layer thickness to the overall thickness of the composite plating film.

The composite plating film of invention example 2 contains no Sn. In comparative example 1, a single layer of lead alloy containing no inorganic particles is plated on the bearing alloy layer, so that in the case of comparative example 1, it will be inappropriate to refer to the plating as a composite plating film, so it is referred to as an overlay layer. The lead alloy of comparative examples 1 and 3 contain no In. The lead alloy of comparative example 2 contains no Cu.

TABLE 1

| Type | No. | Bearing alloy | Intermediate plating layer | | Pb alloy (mass %) | | | Lower Layer | | Inorganic particles | | | Outermost surface layer | | | Rate of outermost surface layer (%) |
|---|---|---|---|---|---|---|---|---|---|---|---|---|---|---|---|---|
| | | | Element | Thickness ($\mu$m) | Pb | Sn | In | Thickness ($\mu$m) | Cu (mass %) | Type | Size ($\mu$m) | content (vol %) | Thickness ($\mu$m) | Cu (mass %) | Inorganic particles (vol %) | |
| Invention example | 1 | Cu | Ni | 1.5 | Bal. | 10 | 5 | 15 | 1.5 | $Si_3N_4$ | 1.0 | 1.5 | 5 | 0 | 0 | 25 |
| | 2 | Cu | Ni | 1.5 | Bal. | — | 10 | 15 | 1.5 | $Si_3N_4$ | 1.0 | 1.5 | 5 | 0 | 0 | 25 |
| | 3 | Cu | Ni | 1.5 | Bal. | 10 | 12.5 | 18 | 2.5 | $Si_3N_4$ | 1.0 | 1.5 | 2 | 0 | 0 | 10 |
| | 4 | Cu | Ni | 1.5 | Bal. | 10 | 12.5 | 15 | 1.5 | SiC | 1.0 | 1.5 | 5 | 0 | 0 | 25 |
| | 5 | Cu | Ni | 1.5 | Bal. | 10 | 12.5 | 15 | 1.5 | BN | 1.0 | 1.5 | 5 | 0 | 0 | 25 |

TABLE 1-continued

| | | Intermediate plating layer | | | Lower Layer | | | | | | Outermost surface layer | | | Rate of outermost surface layer (%) |
|---|---|---|---|---|---|---|---|---|---|---|---|---|---|---|
| | | Bearing | | | | | | | Inorganic particles | | | | Inorganic | |
| | | | Element | Thickness (μm) | Pb alloy (mass %) | | | Thickness (μm) | Cu (mass %) | | Size (μm) | content (vol %) | Thickness (μm) | Cu (mass %) | particles (vol %) |
| Type | No. | alloy | | | Pb | Sn | In | | | Type | | | | | |
| | 6 | Cu | Co | 1.5 | Bal. | 10 | 12.5 | 12 | 1.5 | Si$_3$N$_4$ | 1.0 | 1.5 | 8 | 0 | 0 | 40 |
| | 7 | Al | Ag | 1.5 | Bal. | 10 | 12.5 | 15 | 1.5 | Si$_3$N$_4$ | 1.0 | 1.5 | 5 | 0 | 0 | 25 |
| | 8 | Al | Cu | 1.5 | Bal. | 10 | 12.5 | 15 | 1.5 | Si$_3$N$_4$ | 1.0 | 1.5 | 5 | 0 | 0 | 25 |
| Comparative example | 1 | Cu | Ni | 1.5 | Bal. | 10 | — | 20 | 12 | — | — | — | 0 | 0 | 0 | 0 |
| | 2 | Cu | Ni | 1.5 | Bal. | 10 | 12.5 | 19 | 0 | Si$_3$N$_4$ | 1.0 | 1.5 | 1 | 0 | 0 | 5 |
| | 3 | Cu | Ni | 1.5 | Bal. | 10 | — | 10 | 1.5 | Si$_3$N$_4$ | 1.0 | 1.5 | 10 | 0 | 0 | 50 |

Figure 2:
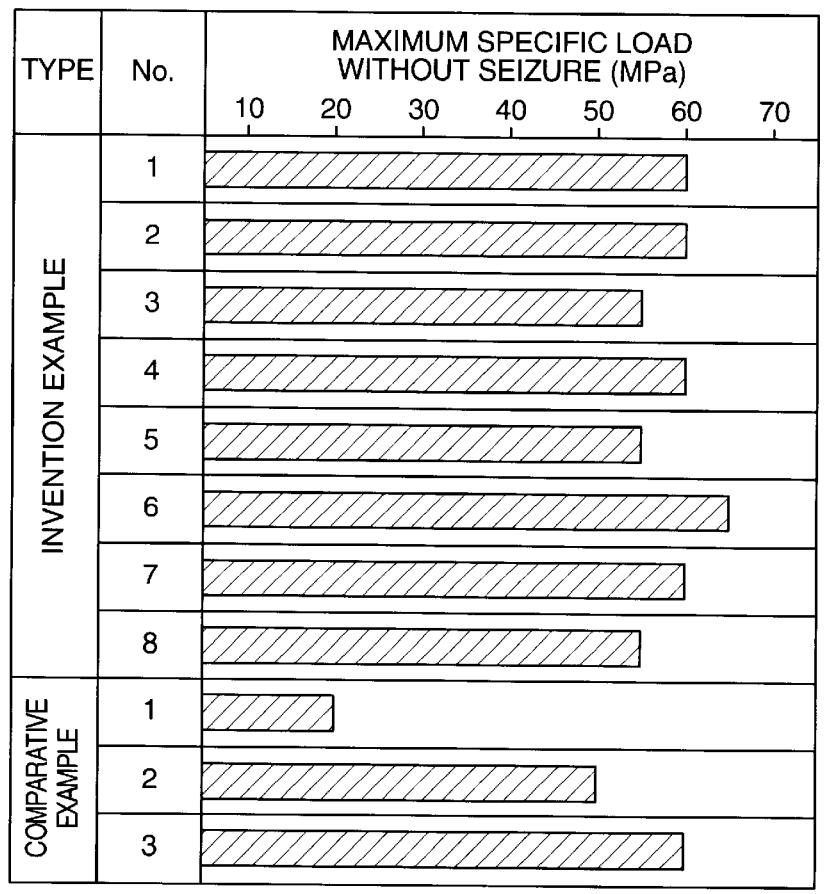
FIG. 2 is a graph showing the results of a seizure test.

The seizure test and the fatigue test were conducted under the conditions shown in Table 2 by setting each bearing example in a testing machine with an offset of 2 mm from the housing center. In the seizure test, the test load was increased by a method of an accumulating load according to which it was increased in ten minutes increments of 10 MPa and a maximum load without seizure was regarded as a test result. In the fatigue test, the test machine was operated for 20 hours under a test load, and when a crack (or cracks) could be confirmed by visual observation, the test piece was judged as being fatigued, and when no crack could be confirmed, the test piece was judged as being not fatigued. Results of the seizure test are shown in FIG. 2, and results of the fatigue test are shown in Table 3.

TABLE 2

| ITEM | DIMENSION |
|---|---|
| Shaft diameter | ø 53 mm |
| Bearing width | 17 mm |
| Revolutions | 3,250 rpm |
| Peripheral speed | 9 m/sec |
| Lubricant | SAE#20 |
| Oil inlet temperature | 100° C. |
| Oil supply pressure | 0.49 MPa |
| Shaft material | JIS S55C |
| Hardness | 50–60 HRC |
| Roughness | Rmax 1 μm |

TABLE 3

| Type | No. | Fatigue in overlay |
|---|---|---|
| Invention example | 1 | not fatigued |
| | 2 | not fatigued |
| | 3 | not fatigued |
| | 4 | not fatigued |
| | 5 | not fatigued |
| | 6 | not fatigued |
| | 7 | not fatigued |
| | 8 | not fatigued |
| Comparative example | 1 | not fatigued |
| | 2 | fatigued |
| | 3 | fatigued |

As can be seen from the test results, the invention examples show excellent initial conformability and anti-seizure property as well as high fatigue resistance. In contrast, comparative example 1, although exhibiting high fatigue resistance as Cu is contained in the overlay, is low in initial conformability and also poor in anti-seizure property as Cu is contained in the overlay outermost surface layer, too. Comparative example 2, which contains no Cu in the outermost surface layer of the composite plating film and in its lower layer as well, shows an improvement of anti-seizure property but is low in fatigue resistance. Comparative example 3 is poor in fatigue resistance as the layer containing Cu and inorganic particles is not exposed even when the normal wear stage is reached after passing initial running-in stage because of too large thickness of the outermost surface layer containing neither Cu nor inorganic particles.

The present invention is not limited to the embodiments described above and shown in the drawings, but the expansions or modifications such as exemplified below can be made without departing from the scope and spirit of the invention.

The lower layer of the composite plating film may be formed by composite plating of a Pb—Sn—Cu alloy and inorganic particles, and the outermost surface layer may be formed by plating of a Pb—Sn—In alloy.

The lower layer of the composite plating film may consist of a plurality of sub-layers and may be so structured that the deeper the sub-layer depth is, the higher the contents of Cu and inorganic particles. Also, the lower layer may be a single layer and may be so designed that it will have a continuously increasing content of Cu and inorganic particles along the thickness.

What is claimed is:

1. A sliding member comprising a bearing alloy layer and a composite plating film provided on the bearing alloy layer, wherein the composite plating film is made of a lead alloy containing 0.1 to 10 mass percent in total of copper and 0.3 to 25 volume percent in total of co-deposited inorganic particles, and the outermost surface layer of the composite plating film, which has a thickness proportion of 10 to 40% to the entire thickness of the composite plating film, does not contain inorganic particles and copper.

2. A sliding member according to claim 1, wherein the lead alloy of the composite plating film contains 2 to 30 mass % in total of at least one of Sn and In.

3. A sliding member according to claim 2, wherein there is provided an intermediate plating layer between the bearing alloy layer and the composite plating film, which consists of any one selected from the group of Ni, Ag, Cu, Co and an alloy thereof.

4. A sliding member according to claim 1, wherein there is provided an intermediate plating layer between the bearing alloy layer and the composite plating film, which consists of any one selected from the group of Ni, Ag, Cu, Co and an alloy thereof.

* * * * *